June 22, 1943.  W. R. LINDEN  2,322,300
MULTIFLAME WELDING TIP
Filed Oct. 1, 1940
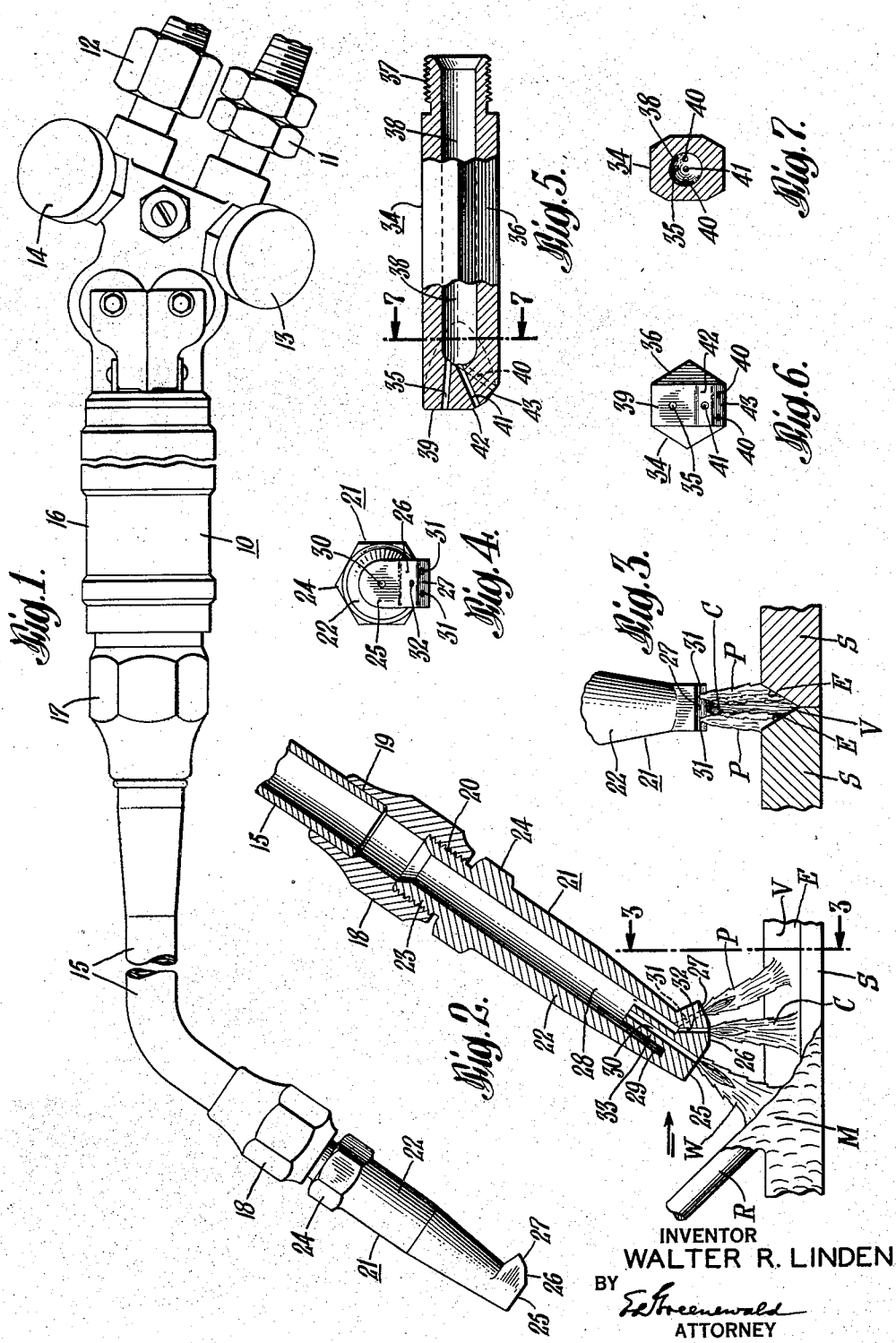
INVENTOR
WALTER R. LINDEN
BY
*E. Greenewald*
ATTORNEY

UNITED STATES PATENT OFFICE 2,322,300

MULTIFLAME WELDING TIP

Walter R. Linden, Palisades Park, N. J., assignor to The Linde Air Products Company, a corporation of Ohio Application October 1, 1940, Serial No. 359,193

3 Claims. (Cl. 158—27.4)

This invention relates to welding apparatus and particularly to multi-flame tips for oxyacetylene welding blowpipes.

Multi-flame blowpipe nozzles or tips for high speed welding by hand are ordinarily designed to accomplish welding in three separate and distinct steps. Since multi-flame welding is generally a back-hand operation, the initial step consists in preheating the adjoining edges of the base metals to be welded by means of a series of small work preheating flames. The second step consists of preheating the welding rod or filler metal by means of one or more rod preheating flames provided for such purpose. The last or final step consists in the actual welding operation wherein the preheating filler metal is melted into the groove formed by the abutting edges of the base metal. By virtue of the two preheating operations, very high welding speed may be attained, but in order to attain a satisfactory joint the operator must be specifically trained to handle the multi-flame welding nozzle or tip to obtain proper penetration and control of the relatively large pool of molten metal in the welding zone without overheating the base metal. With known welding tips of the multiflame type, the specific speed of the operation is more or less an inherent quality of the tip and for greatest efficiency and proper welding such specific speed must be maintained throughout the entire operation.

An important object of this invention is to overcome disadvantages of conventional high speed welding tips in the provision of a multiflame welding tip adapted to produce work preheating and welding flames that are relatively closely spaced or clustered and, therefore, are of less heat intensity so that the actual portion of the base metal processed at one time is decreased similarly as in single flame welding. This novel arrangement enables the operator to position correctly the flames with respect to the work more easily and for this reason, the technique of deposition is much like that of single flame welding with which most operators are familiar.

Another important object of the invention is to provide an improved multi-flame welding tip for high speed welding in which it is unnecessary to employ a special alloy filler rod, such as that generally required for high speed welding operations, in order to permit relatively rapid cooling of the weld metal from a high temperature without the usual resulting porosity. A still further object of the invention is to provide a multiflame welding tip which is very efficient and effective in position welding wherein the parts to be joined, such as ferrous metal pipe sections, are not moved during the welding operation.

In accordance with the invention there is provided a substantially tubular unitary body member having at its forward end a front face and a lower projection shaped to provide a bottom face adjacent the front face, and a rear face adjacent the bottom face. The body member is also provided with a gas inlet chamber extending axially through the major portion of its length and terminating in adjacent spaced relation to the forward end of the tip. Extending forwardly from the inlet chamber is a gas outlet passage to the front face for discharging a single main welding jet centrally and into a welding zone and against a welding rod that is being fed into a groove, such as a V, formed by the bevelled edges of the metal parts to be welded together. The tip is also provided with a pair of gas outlet orifices extending downwardly and rearwardly from the forward end of the inlet chamber to the rear face for discharging a pair of work preheating jets at an acute angle against the bevelled edges in equally spaced relatively close relation to the main welding jet. Finally, a single gas outlet port extends downwardly from the forward end of the inlet chamber to the bottom face for discharging a work preheating root jet centrally into the bottom of the groove between the pair of work preheating jets and the main welding jet.

In a preferred embodiment of the invention, the multi-flame welding tip is provided with a tube extending from the forward end and axially into the inlet chamber to provide an inlet for the outlet passage at a point substantially upstream from the outlet orifices and the outlet port and within the inlet chamber.

If desired, according to the invention, the outlet passage may be disposed above and inclined upwardly at an acute angle with respect to the longitudinal axis of the tip.

The several jets of the tip preferably are disposed within a relatively small area to preheat the base metal for a relatively small distance in advance of the welding zone. The operator, therefore, is only required to feed the filler rod into the molten metal puddle created by the welding flame and to maintain the nozzle generally parallel to the line of weld. Furthermore, by the confining of the several jets within the small area and by the slight reduction in size and number of these jets, the gas consumption is considerably reduced with but a small reduction in the actual speed of the process in comparison with known multi-flame welding processes.

The novel features which are believed to be characteristic of this invention are set forth with particularity in the appended claims. The invention itself, however, both as to its organization and method of operation, together with further objects thereof, will best be understood by reference to the specification taken in connection with the accompanying drawing.

Fig. 1 is a fragmentary view in side elevation of an oxyacetylene welding blowpipe provided with a multi-flame tip embodying features of the invention;

Fig. 2 is an enlarged fragmentary view partly in vertical cross section of the tip in operation;

Fig. 3 is a fragmentary view partly in elevation and partly in section taken on line 3—3 of Fig. 2;

Fig. 4 is a view in front end elevation of the tip;

Fig. 5 is a view partly in side elevation and partly in section of a modification;

Fig. 6 is a view in front end elevation of the modification; and

Fig. 7 is a view in cross section taken on line 7—7 of Fig. 5.

Referring to Fig. 1 of the drawing, an oxyacetylene welding blowpipe 10 is provided with an acetylene inlet connection 11 and an oxygen inlet connection 12 adapted to be connected to a suitable source of acetylene and oxygen, respectively, under pressure. The supply of acetylene to the blowpipe is controlled by a conventional acetylene valve 13, and the oxygen supply by an oxygen valve 14. The acetylene and oxygen are conducted by suitable passages within the blowpipe 10 to a mixer which mixes them in the proper proportion to form a combustible mixture suitable for welding, which mixture is delivered to a stem 15 connected to the handle or body 16 of the blowpipe 10 by a nut 17. The discharge end of the blowpipe stem 15 is provided with a nipple 18 permanently brazed thereon at 19; the outer end of the nipple 18 being internally threaded at 20 to receive the inner end of an externally threaded welding tip for convenient replacement of the latter.

Removably connected to the nipple 18 of the blowpipe stem 15 is a multi-flame welding tip 21 comprising a substantially tubular or cylindrical unitary metal body member 22 having an externally threaded portion 23 removably attached to the stem 15 and a hexagonal portion 24 adapted to receive a wrench of standard size for facilitating the threading of the nozzle 21 to the internally threaded nipple 18. At its forward end the body member 22 is provided with a front or welding-flame face 25, a bottom or root-flame face 26 adjacent thereto and rear or preheating-flame face 27 adjacent the bottom face 26. A gas inlet chamber 28 is disposed centrally within the body member 22 and extends axially through the major portion of the length thereof, terminating at its forward end 29 in adjacent spaced relation to the forward end of the tip 21. The gas inlet chamber is adapted to register with the mixed-gas passage in the nipple 18 when the tip 21 is threaded thereto. The tubular body member 22 is preferably formed of copper, the external surface of which is chromium plated.

In the forward end of the nozzle 21 are clustered a plurality of gas outlets, which, in the illustrated form of the invention, consist of a gas outlet passage 30 for producing a main welding flame W, a pair of gas outlet orifices 31, 31 for producing work preheating flames P, P, and a single gas outlet port 32 for producing a central work preheating root flame C. The gas outlet passage 30 is concentric with the longitudinal axis of the nozzle 21 and extends forwardly from the inlet chamber 28 to the front face 25 of the tip for discharging the single main welding jet W centrally and at a relatively acute angle into a welding zone M and against a rod R that is being fed into a groove V formed by the bevelled edges E, E of metal parts S, S to be welded together. The pair of gas outlet orifices 31, 31 extend downwardly and rearwardly from the forward end 29 of the inlet chamber 28 to the rear face 27 for discharging a pair of work preheating jets P, P at an acute angle against the bevelled edges E, E in equally spaced relatively close relation to the main welding jet W. The single gas outlet port 32 extends downwardly from the forward end 29 of the inlet chamber 28 to the bottom face 26 of the tip for discharging the work preheating root jet C centrally into the bottom of the groove V within the triangle formed by the pair of work preheating jets P and the main welding jet W.

Extending rearwardly from its forward end 29 and into the gas inlet chamber 28 is a tube or tubular portion 33 which is adapted to increase the effective length of the gas outlet passage 30 to improve both the stability and the efficiency of the main welding flame W; the three preheating flames P, P and C being fed from the annular passageway in the forward end of the gas inlet chamber 28 between the tube 33 and the chamber 28, and thereby also receiving added stability. The tube 33 preferably extends axially into the inlet chamber 28 to provide an inlet for the outlet passage 30 at a point substantially upstream from the outlet orifices 31, 31 and the outlet port 33 and within the inlet chamber 28.

Referring to Figs. 5, 6 and 7, there is illustrated a modification comprising a multi-frame welding tip 34 wherein the gas outlet passage 35 for producing the main welding flame is disposed above and inclined upwardly at an acute angle with respect to the longitudinal axis of the tip. The nozzle 34 consists essentially of a hexagonal body member 36 having a rearwardly projecting threaded portion 37 for attachment to a blowpipe stem, and an elongated cylindrical gas inlet chamber 38. The main welding flame issues from the gas outlet passage 35 which is drilled through the front face 39 of the nozzle at a slight angle with the central axis of the body 36 and opens into the forward end of the chamber 38, sufficient length of the passage 35 being obtained by reason of the relatively wide forward section of the nozzle. The work-preheating gas outlet orifices 40, 40 and port 41 open to the inclined faces 42 and 43, respectively, the arrangement being such that the four clustered jets do not intersect or interfere with one another.

Referring to Fig. 2 it will be noticed that when the multi-flame welding tip 21 is used in an actual welding operation and positioned about one-half inch above the base metal S, the extremities of the preheating jets P, P are at a point approximately one inch behind the point of impingement of the main welding flame W. It will be obvious, therefore, that slight deviations of the nozzle 21 with respect to the work S will produce such small deflections of the preheating jets that the operator need only control the general position of the body of the nozzle with respect to the weld. Any operator, therefore, with ordinary welding experience can consistently produce high quality welds with either the tip 21 or the tip 34 without an extended period of specialized training, and at a speed considerably faster than that obtained with an ordinary or single flame tip.

Disadvantages of known high speed multi-flame welding tips are thus overcome, according to the invention, by the provision of a multi-flame welding tip wherein the preheating and welding flames are so arranged and closely spaced, and therefore, are of less intensity, so that the actual portion of the base metal processed at any one time is decreased. This arrangement enables the operator to correctly position the flames with respect to the work more easily, and for this reason, the technique of welding is much like that of single flame welding. However, by reason of the lower heat of welding, it becomes unnecessary to employ the special filler rod such as that formerly required for high speed welding operations in order to permit relatively rapid cooling of the weld metal from high temperatures without the usual resulting porosity. Still another advantage of the multi-flame welding tip of the invention resides in its adaptability to position welding operations for the joinder of two or more pre-positioned pieces. The nozzle has its several jets disposed within a relatively small area to preheat the base metal for only a short distance in advance of the welding zone. Thus, the operator is only required to feed the welding rod into the welding puddle created by the welding flame and to maintain the nozzle generally parallel to the line of weld. The confinement of the several jets within a small area and the slight reduction in the size and number of such jets reduces the gas consumption considerably but reduces the actual speed of the process only slightly in comparison with known multi-flame welding processes.

It is intended to include within the meaning of the terms "oxygen" and "acetylene," any combustion-supporting fluid and any combustible fluid, respectively, although commercially pure oxygen gas and acetylene gas are preferred according to the invention.

While there have been described what are at present considered to be preferred embodiments of this invention, it will be obvious to those skilled in the art that various changes and modifications may be made therein without departing from the invention, and it is therefore intended in the appended claims to cover all such changes and modifications as fall within the true spirit and scope of the invention.

I claim:

1. A cluster-type multi-flame oxy-acetylene blowpipe tip for the manual welding of ferrous metal parts in which a welding rod is progressively fed into a groove formed between opposed edges of said parts while the surfaces of the groove are preheated and the end of said rod is melted in a welding zone that progressively advances longitudinally of the groove, said tip comprising a substantially tubular unitary metal body member having at its forward end a welding-flame face lying in a plane that is substantially normal to the longitudinal axis of said member, a root-flame face adjacent said welding-flame face, and a preheating-flame face adjacent said root-flame face, said root-flame face being located between said welding-flame and preheating-flame faces, and said welding-flame, root-flame, and preheating-flame faces lying in planes that are inclined with respect to one another; said member also having a combustible gas inlet chamber extending axially through the major portion of its length and terminating in spaced relation to the forward end of said member; a single gas outlet passage extending substantially axially and forwardly from said inlet chamber to said welding-flame face for discharging a single main welding jet; a pair of gas outlet orifices extending from the forward end of said inlet chamber for discharging a pair of work-preheating jets, said orifices extending in divergent angular relation to said passage; and a single gas outlet port extending from the forward end of said inlet chamber and substantially centrally located in the triangle formed by said passage and said orifices, said port extending to said root-flame face for discharging a work-preheating jet; said orifices and port extending in angular relation on the same side of the axis of said passage, the arrangement being such that, when the tip is positioned about one-half inch from the parts being welded, the extremities of said pair of work-preheating jets impinge against the sides of the groove at a distance of approximately one inch from the point of impingement of the main welding jet.

2. A cluster-type multi-flame oxy-acetylene blowpipe tip for the manual welding of ferrous metal parts in which a welding rod is progressively fed into a groove formed between opposed edges of said parts while the surfaces of the groove are preheated and the end of said rod is melted in a welding zone that progressively advances longitudinally of the groove, said tip comprising a substantially tubular unitary metal body member having a combustible gas inlet chamber extending through the major portion of its length and terminating in spaced relation to the forward end of said member; a single gas outlet passage extending substantially axially and forwardly from said inlet chamber for discharging a single main welding jet; a pair of gas outlet orifices extending from the forward end of said inlet chamber for discharging a pair of work-preheating jets; said orifices extending in divergent angular relation to said passage; and a single gas outlet port extending from the forward end of said inlet chamber and substantially centrally located in the triangle formed by said passage and said orifices, for discharging a work-preheating root jet; said orifices and port extending in angular relation on the same side of the axis of said passage.

3. A cluster-type multi-flame oxy-acetylene blowpipe tip as claimed by claim 2, wherein the longitudinal axis of said tubular body member coincides with the longitudinal axis of said outlet passage.

WALTER R. LINDEN.